United States Patent
Doken et al.

(10) Patent No.: US 12,456,458 B2
(45) Date of Patent: Oct. 28, 2025

(54) METHODS AND SYSTEMS FOR GENERATING SUBTITLES

(71) Applicant: Adeia Guides, Inc., San Jose, CA (US)

(72) Inventors: Serhad Doken, Bryn Mawr, PA (US); Zhiyun Li, Kenmore, WA (US); Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 244 days.

(21) Appl. No.: 18/123,804

(22) Filed: Mar. 20, 2023

(65) Prior Publication Data
US 2024/0321266 A1    Sep. 26, 2024

(51) Int. Cl.
| G10L 15/18 | (2013.01) |
| G10L 15/06 | (2013.01) |
| G10L 15/08 | (2006.01) |
| G10L 15/22 | (2006.01) |
| H04N 21/488 | (2011.01) |

(52) U.S. Cl.
CPC .......... *G10L 15/18* (2013.01); *G10L 15/063* (2013.01); *G10L 15/22* (2013.01); *G10L 2015/088* (2013.01); *H04N 21/4884* (2013.01)

(58) Field of Classification Search
CPC ....... G10L 15/18; G10L 15/063; G10L 15/22; G10L 2015/088; G10L 15/183; G10L 15/26; H04N 21/4884; G06F 40/30
See application file for complete search history.

(56) References Cited

U.S. PATENT DOCUMENTS

| 2011/0093263 A1 | 4/2011 | Mowzoon |
| 2018/0132007 A1* | 5/2018 | Chou ............... H04N 21/47205 |
| 2019/0215545 A1* | 7/2019 | Gupta ..................... G06F 40/40 |
| 2021/0064879 A1* | 3/2021 | Gupta .............. G06V 30/19173 |
| 2022/0293108 A1* | 9/2022 | Kaufman ................ G10L 15/22 |
| 2023/0245649 A1* | 8/2023 | Singh .................. G10L 15/1815 704/9 |
| 2023/0362451 A1* | 11/2023 | Candelore .......... H04N 21/4532 |
| 2023/0386360 A1* | 11/2023 | Alves .................... G06F 40/263 |

OTHER PUBLICATIONS

Hannani et al., "Evaluation of the effectiveness and efficiency of state-of-the-art features and models for automatic speech recognition error detection," J Big Data 8, 5 (2021). https://doi.org/10.1186/s40537-020-00391-w, Jan. 6, 2021.

Rimle et al., "Enriching Video Captions With Contextual Text," ICPR2020 https://doi.org/10.48550/arXiv.2007.14682, Jul. 29, 2020.

Naik et al., "Semantic context driven language descriptions of videos using deep neural network," J Big Data 9, 17 (2022) https://doi.org/10.1186/s40537-022-00569-4, Feb. 10, 2022.

(Continued)

*Primary Examiner* — Stella L. Woo
(74) *Attorney, Agent, or Firm* — HALEY GUILIANO LLP (57) ABSTRACT

Systems and methods are described for generating subtitles. Utterance data is received. First subtitles are generated for the utterance data. A first term is identified in the first subtitles. Contextual data relating to the utterance data is determined. A replacement term for the first term is determined based on the contextual data. Second subtitles are generated for the utterance data. The second subtitles comprise the replacement term.

20 Claims, 7 Drawing Sheets

(56) References Cited

OTHER PUBLICATIONS

Netflix's Cool Automated Subtitling idea using AI and NLP https://ottverse.com/netflix-automated-subtitling-using-ai-nlp/, 2023.
Simplify-then-Translate: Automatic Preprocessing for Black-Box Translation, https://doi.org/10.48550/arXiv.2005.11197, May 27, 2020.
Netflix Builds Proof-of-Concept AI Model to Simplify Subtitles for Translation, Nvidia technical blog: https://developer.nvidia.com/blog/how-netflix-uses-ai-to-simplify-subtitles-for-translation-updated/, Jul. 15, 2020.
Meta's automatic captioning to video ad https://www.facebook.com/business/help/1675722002698686?id=603833089963720, 2023.
Contextual video captioning: Contextual Video Captioning—Media Technology Center | ETH Zurich, May 31, 2023.
YouTube and TikTok Add New Options for Automated Captions, Improving Accessibility | Social Media Today Published Apr. 12, 2022.
A new protein discovered that repairs DNA | EurekAlert! Peer-Reviewed Publication, University of Serville, Oct. 14, 2020.
What is named entity recognition (NER) and how can I use it? Christopher Marshall, published in super.AI (Dec. 18, 2019) https://medium.com/mysuperai/what-is-named-entity-recognition-ner-and-how-can-i-use-it-2b68cf6f545d.

\* cited by examiner

METHODS AND SYSTEMS FOR GENERATING SUBTITLES

BACKGROUND

The present disclosure relates to methods and systems for generating subtitles and/or training a network to generate subtitles. Particularly, but not exclusively, the present disclosure relates to improving previously generated subtitles based on contextual data relating to the media content to which the subtitles relate.

SUMMARY

Auto-subtitling aims to generate subtitles automatically from media content, such as live or pre-recorded programming, by automatically recognizing text from the speech in the media content. The underlying technology of auto-subtitling is called automatic speech recognition, or ASR for short. ASR systems aim to convert speech signal to text, and is an active research area. The accuracy of an ASR system is affected by various factors, for example, by the speaker's age, gender, emotion, volume, accent, speed, background noise and music, etc. Additionally or alternatively, the speaker may say some out-of-vocabulary (OOV) words, such as industry-specific terminology, slang words or acronyms unknown to the ASR model. As a result, an ASR system may generate subtitles that do not accurately reflect the speech in the media content and/or are difficult to understand by some users. This may result a larger operational demand being placed on the ASR system, e.g., by virtue of user interaction with the ASR system attempting to ascertain the meaning of the subtitles.

Systems and methods are provided herein for generating improved subtitles, e.g., by determining when one or more words or phrases in a portion of text can be replaced and/or otherwise supplemented by other more accurate words or phrases, and/or by words or phrases that may be better understood by the intended audience of the subtitled text. For example, a portion of subtitled text may contain the term "dems", which is used colloquially to refer to the term "Democrats". The systems and methods described herein provide for identifying the term "dems" as a term that may not be understood by the intended audience of the subtitles, and for replacing that term with the term "Democrats", which may be understood by a larger range of the intended audience. Additionally or alternatively, generating improved subtitles may comprise inserting a supplemental term, e.g., a term expanding a contraction, acronym, initial, etc., into the subtitles to help a user better understand the subtitles. Generating improved subtitles can reduce a number of user initiated queries received by the system, e.g., when a user does not understand a portion of the subtitles and/or desires clarification of a portion of the subtitles. In some examples, a supplemental term may be inserted into the subtitles, e.g., in parentheses, following a portion of text, e.g., to improve a comprehension level of that portion of text.

For the avoidance of doubt, the systems and methods provided herein may be used more broadly for generating improved transcription data, e.g., of a live event or recorded content. In some examples, the improved transcription data comprises the improved subtitles. Additionally or alternatively, the improved transcription data may be used to generate audio data, e.g., automatically. In some examples, the audio data may be used to generate improved dubbing and/or narration of content. Furthermore, while the below examples may refer to a "replacement term", e.g., an entity that has been identified as a possible candidate for substitution in a portion of subtitles (e.g., the entity "Democrats" may be a replacement entity for the entity "dems"), it is to be understood that a "replacement term" may be used as a "supplemental term" (e.g., the entity "Democrats" may be used to supplement the entity "dems" (e.g., "dems [Democrats]"). Where the below examples refer to "replacement term", the scope of the present disclosure extends to "supplemental term", and the two terms are not mutually exclusive.

In particular, the systems and methods disclosed herein use contextual data to enhance auto-subtitling performance. In the context of the present disclosure, the term "contextual data" is understood to mean information relating to an utterance, e.g., speech of an individual, for which the subtitles are generated. In some examples, the utterance may be part of a media content item, either live or recorded. For example, contextual data may comprise at least one of content item metadata, one or more (audio and/or textual) comments relating to or referencing the media content or subject matter thereof, and/or any other appropriate data relating to the content item, such as data accessible over a network, e.g., an internet source. Using the contextual data, the systems and methods are able to identify alternative terms, such as new words, specific names, acronyms, scientific terms, and phrases, etc., which may be used as replacement terms in the subtitles. In some examples, auto-subtitling systems and methods can incorporate the contextual data into a prediction model, thus improving its performance. Since the amount of contextual data may increase over time, e.g., as a result of with more social interactions, comments, etc., the auto-subtitling result can also improve and update over time accordingly.

Additionally or alternatively, systems and methods are provided herein for training a network to generate improved subtitles, e.g., by virtue of the processes disclosed herein. While the term "auto-subtitling" is different from "auto-captioning", which aims to generate a textual summary by understanding the video/image content, the disclosed system and methods may apply equally to "auto-captioning" systems and methods. Additionally or alternatively, the systems and methods are not limited to generating subtitles for media content. In particular, the system and methods disclosed herein can be used for automatically generating transcriptions of any appropriate utterance, such as transcriptions of webinars, court proceedings, lectures, etc. In some examples, the systems and methods may include an indication that a term has been replaced in a portion of transcribed or subtitled text.

According to the systems and methods described herein subtitles are generated. For example, the subtitles may be improved subtitles comprising one or more replacement and/or supplemental terms. According to a first aspect, utterance data is received. In some examples, utterance data may be derived from an utterance, e.g., speech, of an individual, such as an individual speaking, or a recording of an individual speaking. First subtitles for the utterance data are generated. The first subtitles may be unmodified subtitles, e.g., subtitles corresponding to a direct transcription of the utterance. A first term in the first subtitles is identified. Contextual data relating to the utterance data is determined. A replacement term and/or a supplemental term for the first term is determined based on the contextual data. Second subtitles are generated for the utterance data, the second subtitles comprising the replacement term and/or the supplemental term. In this manner the second subtitles may be regarded as improved over the first (e.g., unmodified) subtitles. Such an improvement can lead to a reduction in operational load on the system by virtue of fewer user-initiated processes, such as queries, comments and/or discussions, in response to display of the first (e.g., unmodified) subtitles.

In some examples, the contextual data may be filtered, e.g., prior to determining the replacement term. In some examples, natural language processing (NLP) techniques and named entity recognition (NER) can be used to filter the contextual data. For example, low quality text data and/or spam may be filtered from the contextual data, while retaining high relevance terms to further improve the data quality.

In some examples, determining the contextual data comprises determining one or more types of contextual data. For example, determining the contextual data may comprise determining at least one user comment relating to the utterance data. In some examples, determining the contextual data may comprise performing a search of a database for information relating to the utterance data. In some examples, determining the contextual data may comprise accessing historic utterance data. In some examples, determining the contextual data may comprise accessing metadata relating to the utterance.

In some examples, when the contextual data comprises multiple types of contextual data, each type of contextual data may be allocated a weighting. In some examples, determining the replacement term may be based on the weighted contextual data. For example, a first replacement term may be selected from multiple replacement terms based on the first replacement term having a higher weighting than the other replacement terms.

In some examples, a temporal relationship between the first term and a second term in the first subtitles may be determined. For example, control circuitry may determine a period between a first time relating to the display of the first term in the first subtitles and a second time relating to the display of the second term in the first subtitles. In some examples, the second subtitles may be generated based on the temporal relationship between the first term and a second term in the first subtitles. For example, the replacement term may be selected from multiple replacement terms based on a time gap between the first term and a second term in the first subtitles. In some examples, the first term and a second term in the first subtitles may be the same term or different terms.

In some examples, determining the contextual data comprises determining a temporal relationship between the first term in the first subtitles and the at least one user comment. For example, control circuitry may determine a period between a first time relating to the display of the first term in the first subtitles and a second time relating a time at which a user comment was generated, e.g., posted online. In some examples, the second subtitles may be generated based on the temporal relationship between the first term and at least one user comment. For example, the replacement term may be selected from multiple replacement terms based on a time gap between the first term and at least one user comment.

In some examples, a user type of a user intending to consume the second subtitles may be determined. For example, control circuitry may access a user profile to determine an identity of a user who is consuming the first subtitles. Additionally or alternatively, control circuitry may access a user profile to determine an identity of a user who is or intending to consume (i.e., about to consume) the second subtitles and/or subsequent subtitles. In some examples, determining the replacement term comprises selecting the replacement term from multiple suitable replacement terms based on the user type of a user consuming the first subtitles and/or a user about to consume the second subtitles.

In some examples, a user reaction relating to the first subtitles is determined. In some examples, determining the replacement term comprises selecting the replacement term from multiple suitable replacement entities based on the user reaction.

In some examples, one or more networks may be trained using data relating to the first subtitles, the second subtitles, the contextual data and/or a user reaction.

In some examples, a user reaction relating to the second subtitles may be determined. For example, one or more networks may be trained based on the user reaction to the first subtitles and/or the second subtitles. In some examples, third subtitles may be generated using the trained network. In some examples, the first subtitles may be a first set of training data, the second subtitles may be a second set of training data, the contextual data may be a third set of training data and the determined user reaction(s) may be a fourth set of training data.

According to a second aspect, systems and methods are described herein for training a network implementing an ASR model. First subtitles are generated using the ASR model. Second subtitles are generated using the ASR model based on contextual data relating to the first subtitles. The ASR model is trained using data relating to the first subtitles, the second subtitles and the contextual data. Third subtitles are generated using the trained ASR model.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
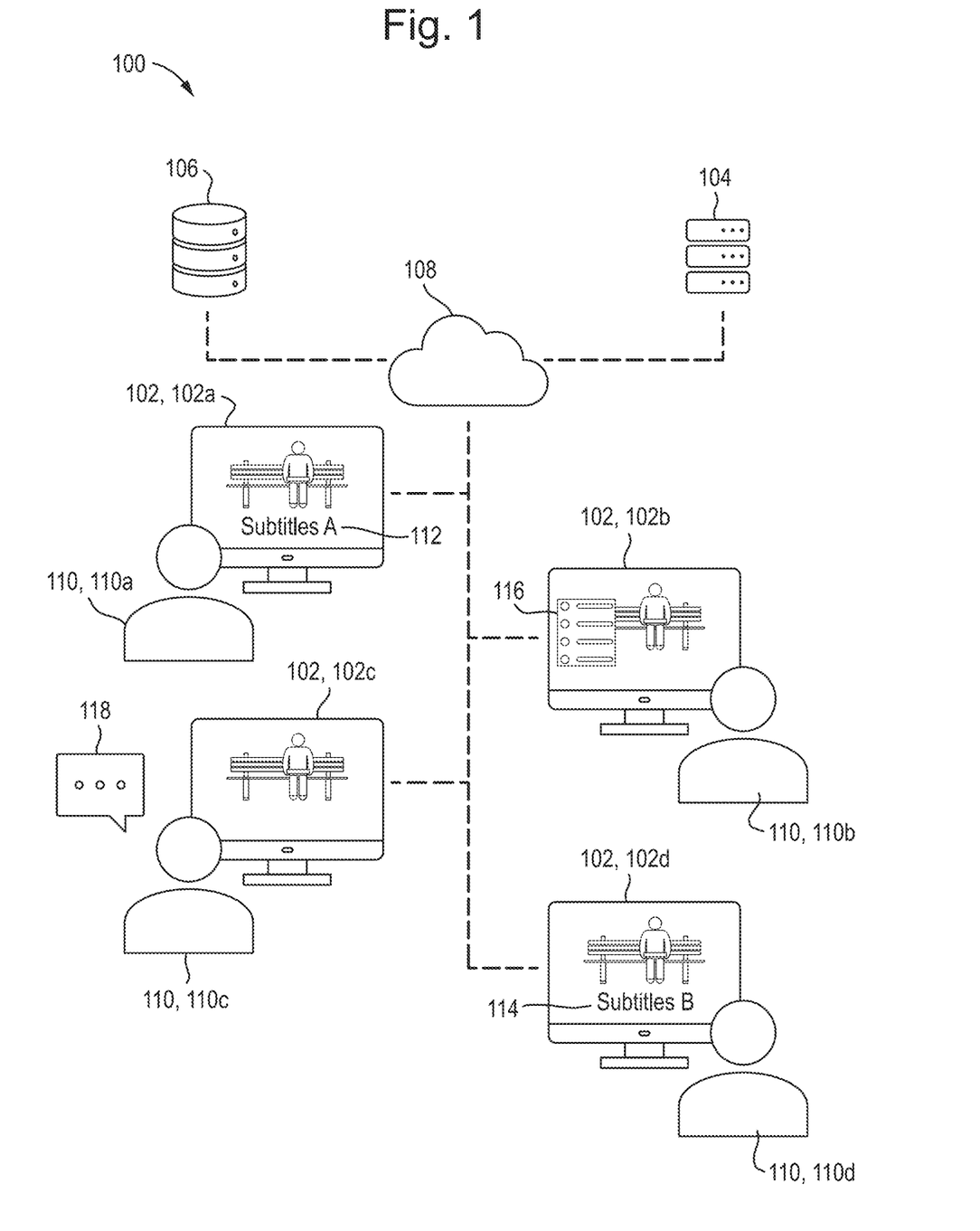
FIG. 1 illustrates an overview of the system for generating subtitles, in accordance with some examples of the disclosure.

FIG. 1 illustrates an overview of a system 100, e.g., an ASR system, for generating subtitles, e.g., replacement and/or supplemented subtitles, for media content based on contextual data. In particular, the example shown in FIG. 1 illustrates various users 110 consuming a media asset on respective user devices 102, either concurrently or at different times. Each user device 102 is communicatively coupled to a server 104 and a content item database 106, e.g., via network 108. In this manner, the user devices 102 provide the users 110 with access to a service provided by a content provider operating server 104. In the example shown in FIG. 1, each of the users 110 is watching the movie "Forrest Gump" on a respective user device 102. However, it is understood that the present disclosure is not limited to the consumption of movies, and the users 110 may be watching any appropriate media content, such as stored/recorded media content, or a live transmission, such as a sports event, a news report, a webinar, or a lecture.

Each user device 102 may be a physical electronic device. Example user devices 102 include TVs, laptops, head-mounted displays, mobile phones, wearable devices (e.g., smart watches), and/or any other appropriate user device 102 configured to display media content having subtitles to a user. In the example shown in FIG. 1, a first user 110a is watching the movie on user device 102a, which is configured to display first subtitles 112 (Subtitles A), which may be subtitles provided by a content provider, or auto-generated subtitles provided by system 100 using ASR methodology. FIG. 1 also shows a second user 110b and a third user 110c each watching the movie on user devices 102b and 102c, respectively. A fourth user 110d is watching the movie on user device 102d, which is configured to display second subtitles 114 (Subtitles B), which are different from first subtitles 112. For example, for the same or similar portion of the movie, the second subtitles 114 may be a modified version of the first subtitles. The present disclosure relates to how subtitles are modified, automatically, based on contextual data, e.g., to provide a better quality of experience (QoE) to a user. For example, in the movie "Forrest Gump", Forrest often speaks unclearly, which makes it difficult for an ASR system to generate accurate text with high confidence. In particular, it may be difficult for an ASR system to generate accurate subtitles for spoken sentences in the movie, like "My mama always said, 'Life was like a box of chocolates. You never know what you're gonna get'." As such, system 100 uses contextual data, such as metadata relating to the movie, user comments, and/or information retrieved from a database, to generate accurate subtitles, e.g., when a confidence level of generated subtitles is below a threshold confidence level.

In the example shown in FIG. 1, system 100 is configured to receive user comments, e.g., text comments 116 made by user 110b and/or spoken comments 118 made by user 110c. In some examples, user comments may be time-stamped so that system 100 can determine to which portion of the movie the comments apply. For example, the movie may be being watched as part of a group watching sessions (e.g., a watch party), where one user (e.g., user 110b) asks "What did Forrest just say?", and in response, another user (e.g., user 110c) replies "'Life was like a box of chocolates. You never know what you're gonna get'." In such a case, system 100 may store the user exchange as contextual data relating to the movie. In this manner, system 100 may access the contextual data relating to the movie when generating subtitles. For example, when the auto-generated subtitles for the movie, e.g., first subtitles 112, are below a threshold confidence level, system 100 may access the contextual data to help determine subtitles with a greater likelihood of being correct and/or more easily understood, e.g., second subtitles 114. Furthermore, the auto-generated second subtitles may then be used for training a network. For the avoidance of doubt, users 110b and 110c may be watching the movie at the same time as each other, or at different times from each other, when making the comments. Users 110a and 110d may each also be watching the movie together or at different times from each other, and/or from users 110b and 110c. In some examples, users may be consuming different but related content. For example, e.g., while user 110a may be watching a movie, user 110b may be listening to an audio book of the movie, and user 110c may be watching other content related to the movie, such as a trailer, an online review, etc. Generally, system 100 may be configured to identify relevant contextual information from disparate sources, and generate improved subtitles for one or more users consuming the same, similar or related content.

In another example, in a knife-making video accessible via the internet, a speaker may pronounce "knife" as "life" because of an accent. Without knowing the context, an ASR system may output "life" in the first subtitles. However, from the description of the video by the host, and/or from the comments by users, the speaker is obviously talking about a "knife". Therefore, the ASR system knows that "knife" is more likely to occur in the speech than "life", even if the pronunciation is clearly "life".

In another example, in a scientific presentation video, a speaker introduces a new protein, and gives it a new name, e.g., "cryptochrome". Without any contextual data and assuming this name is an out-of-vocabulary term, the ASR system, will struggle to get it correct since this name sounds like two separate common words: "crypto" and "chrome". The ASR system may even mistake it as "cryptocurrency". However, the video description, user comments, or linked documents, may contain the one word "cryptochrome". Therefore, the ASR system can include this new word in its model and predict correctly.

Figure 2:
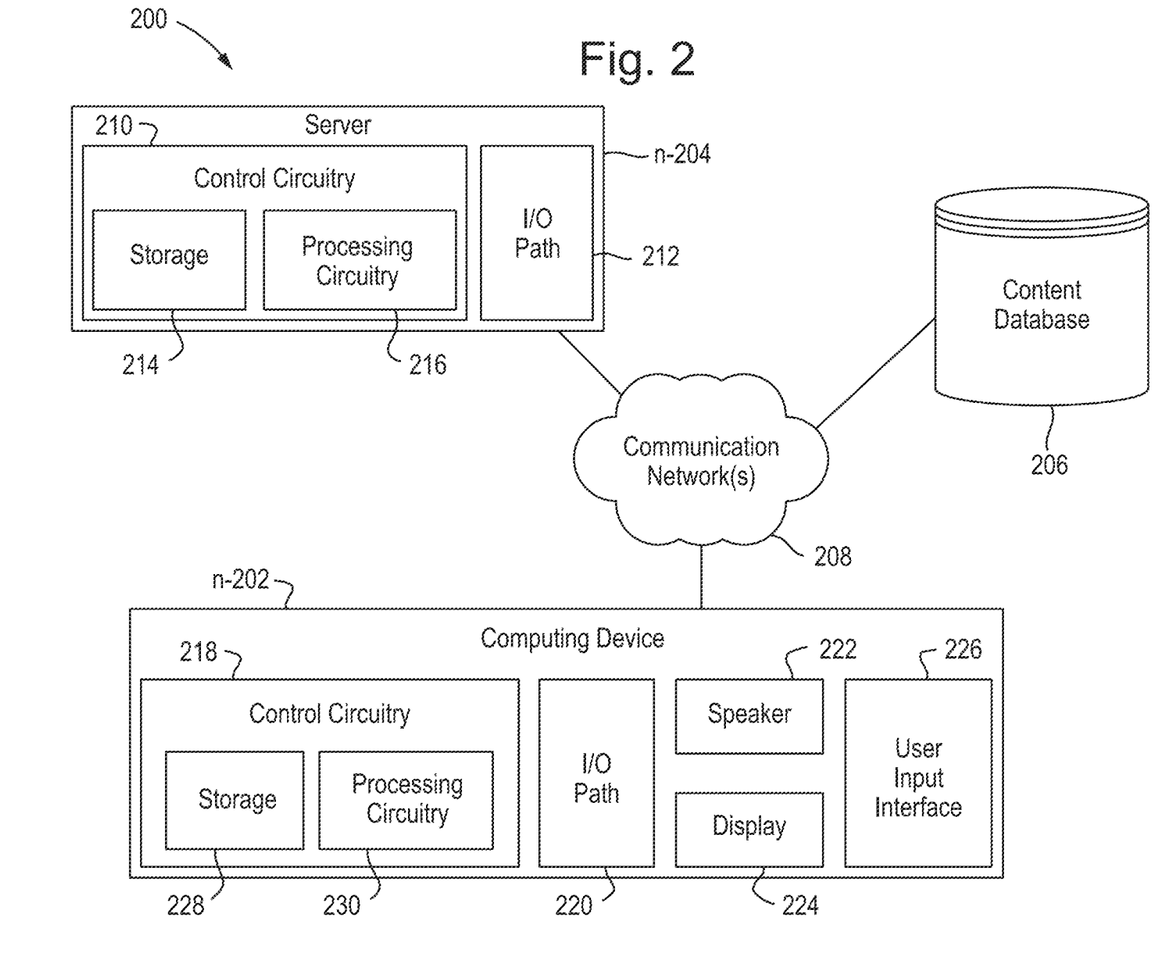
FIG. 2 is a block diagram showing components of an example system for generating subtitles, in accordance with some examples of the disclosure.

FIG. 2 is an illustrative block diagram showing example system 200, e.g., a non-transitory computer-readable medium, configured to generate subtitles. Although FIG. 2 shows system 200 as including a number and configuration of individual components, in some examples, any number of the components of system 200 may be combined and/or integrated as one device, e.g., as user device 102. System 200 includes computing device n-202 (denoting any appropriate number of computing devices, such as user device 102), server n-204 (denoting any appropriate number of servers, such as server 104), and one or more content databases n-206 (denoting any appropriate number of content databases, such as content database 106), each of which is communicatively coupled to communication network 208, which may be the Internet or any other suitable network or group of networks, such as network 108. In some examples, system 200 excludes server n-204, and functionality that would otherwise be implemented by server n-204 is instead implemented by other components of system 200, such as computing device n-202. For example, computing device n-202 may implement some or all of the functionality of server n-204, allowing computing device n-202 to communicate directly with content database n-206. In still other examples, server n-204 works in conjunction with computing device n-202 to implement certain functionality described herein in a distributed or cooperative manner.

Server n-204 includes control circuitry 210 and input/output (hereinafter "I/O") path 212, and control circuitry 210 includes storage 214 and processing circuitry 216. Computing device n-202, which may be an HMD, a personal computer, a laptop computer, a tablet computer, a smartphone, a smart television, or any other type of computing device, includes control circuitry 218, I/O path 220, speaker 222, display 224, and user input interface 226. Control circuitry 218 includes storage 228 and processing circuitry 220. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 may be instructed by the application to perform the functions discussed herein. In some implementations, any action performed by control circuitry 210 and/or 218 may be based on instructions received from the application. For example, the application may be implemented as software or a set of executable instructions that may be stored in storage 214 and/or 228 and executed by control circuitry 210 and/or 218. In some examples, the application may be a client/server application where only a client application resides on computing device n-202, and a server application resides on server n-204.

The application may be implemented using any suitable architecture. For example, it may be a stand-alone application wholly implemented on computing device n-202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server n-204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server n-204). For example, the remote server may store the instructions for the application in a storage device. The remote server may process the stored instructions using circuitry (e.g., control circuitry 210) and/or generate displays. Computing device n-202 may receive the displays generated by the remote server and may display the content of the displays locally via display 224. This way, the processing of the instructions is performed remotely (e.g., by server n-204) while the resulting displays, such as the display windows described elsewhere herein, are provided locally on computing device n-202. Computing device n-202 may receive inputs from the user via input interface 226 and transmit those inputs to the remote server for processing and generating the corresponding displays.

A computing device n-202 may send instructions, e.g., to generate subtitles, to control circuitry 210 and/or 218 using user input interface 226.

User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server n-204 and computing device n-202 may transmit and receive content and data via I/O path 212 and 220, respectively. For instance, I/O path 212, and/or I/O path 220 may include a communication port(s) configured to transmit and/or receive (for instance to and/or from content database n-206), via communication network 208, content item identifiers, content metadata, natural language queries, and/or other data. Control circuitry 210 and/or 218 may be used to send and receive commands, requests, and other suitable data using I/O paths 212 and/or 220.

Figure 3:
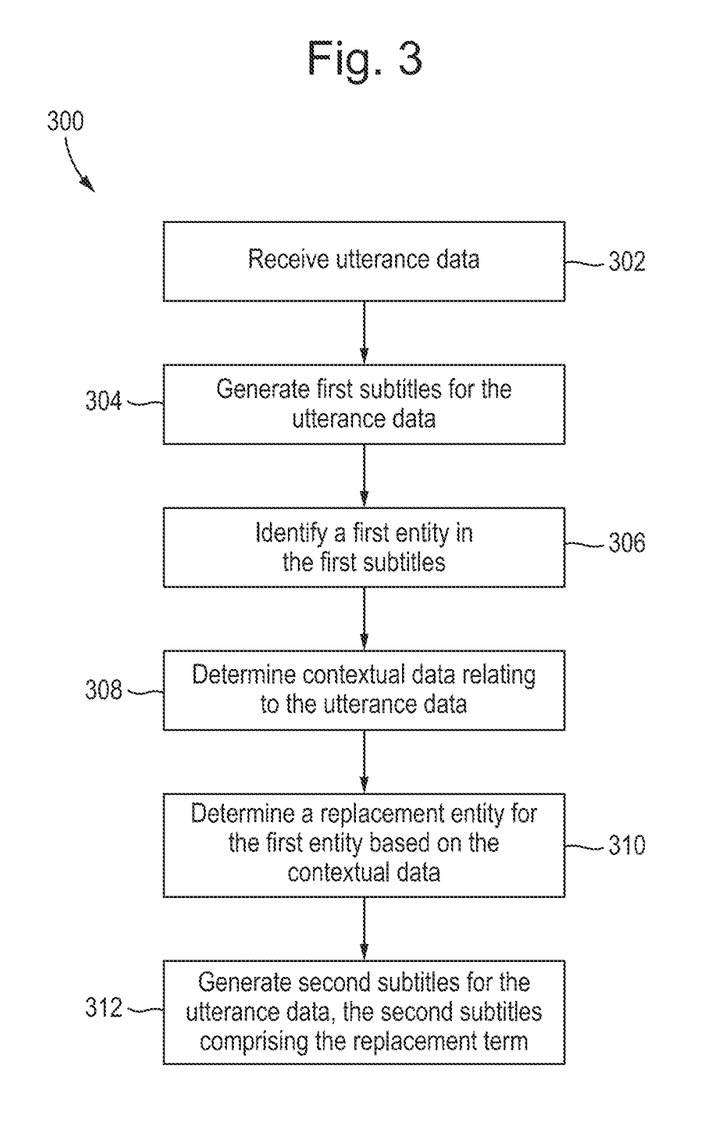
FIG. 3 is a flowchart representing a process for generating subtitles, in accordance with some examples of the disclosure.
Figure 4A:
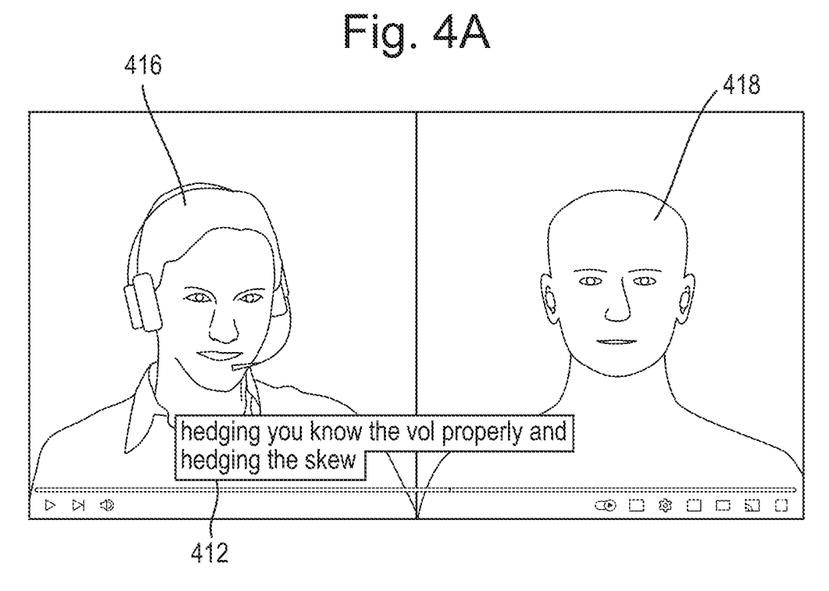
FIG. 4A illustrates an example of media content having first subtitles, in accordance with some examples of the disclosure.
Figure 4B:
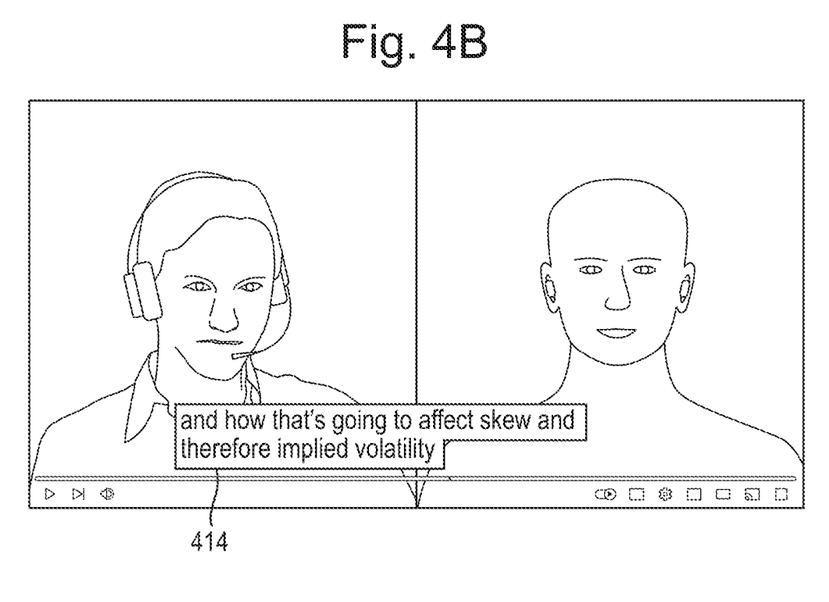
FIG. 4B illustrates an example of media content having second subtitles, in accordance with some examples of the disclosure.

FIG. 3 shows a flowchart representing an illustrative process 300 for generating subtitles. FIG. 4A illustrates a media content item having first subtitles. FIG. 4B illustrates a media content item having second subtitles. While the example shown in FIGS. 3 to 4B refers to the use of system 100, as shown in FIG. 1, it will be appreciated that the illustrative process 300 shown in FIG. 3, with reference to FIGS. 4A and 4B, may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102 and control circuitry of server 104, working either alone or in some combination.

At 302, control circuitry, e.g., control circuitry of server 104, receives utterance data. For example, utterance data may comprise an audio track of a media content item, such as the movie "Forrest Gump", as discussed in relation to FIG. 1. However, utterance data may be any appropriate data derived from speech, such as the internet-accessible media content shown in FIGS. 4A and 4B. For example, utterance data may be a soundwave relating to a portion of speech, either live or recorded. In some examples, utterance data may comprise phonemes, words and/or sentences derived from a sound wave. For example, where subtitles are being generated for a media content item, server 104 may receive for processing an audio track, e.g., a speech track, of a movie from a content provider. In other examples, a speech track may be separated from a video, e.g., for processing at server 104. When the media content is a live broadcast/transmission of an event, utterance data may be a sound wave captured at the live event. In the example shown in FIGS. 4A and 4B, the utterance data comprises the speech of two individuals in a video speaking about the finance industry.

At 304, control circuitry, e.g., control circuitry of server 104, generates first subtitles 412 for the utterance data. For example, an ASR system implemented at server 104 may process the utterance data and generate first subtitles 412 " . . . hedging you know the vol properly and hedging the skew."

At 306, control circuitry, e.g., control circuitry of server 104, identifies one or more terms, e.g., words, entities, and/or phrases, etc., in the first subtitles 412. For example, control circuitry may identify one or more separate entities, such as "vol", for which a confidence level in the auto-generated transcription of the entity is low, e.g., based on the entity "vol" having a close relationship to the word "volume", which makes little grammatical or semantic sense, in this case. Additionally or alternatively, control circuitry may determine that, overall, the first subtitles 412 " . . . hedging you know the vol properly and hedging the skew" may be difficult to understand, e.g., based on the entity "hedging" having an alternative meanings, i.e., "the planting or trimming of hedges", "to limit or qualify (something) by conditions or exceptions", and "to protect oneself against loss on (a bet or investment) by making balancing or compensating transactions". In some examples, control circuitry may rank or score the first subtitles 412 as having a comprehension level above or below a comprehension level threshold. For example, the first subtitles 412 " . . . hedging you know the vol properly and hedging the skew" may be an accurate transcription, but likely be difficult to understand by an audience not well versed in the finance industry. As such, identification, carried out at 306, may be based on a confidence level in the transcription being below a threshold confidence level, e.g., by the entity "vol" being an OOV term, either alone or in combination with a comprehension level above a comprehension level threshold.

At 308, control circuitry, e.g., control circuitry of server 104, determines contextual data relating to the utterance data, e.g., using NER techniques. For example, control circuitry may access database 106 and retrieve metadata for the video being shown in FIGS. 4A and 4B. In some examples, control circuitry may retrieve metadata relating to the video, such as one or more tags or other information added by the video provider, e.g., a date and/or time of recording the video, one or more people featured in the video, location information, language information, etc. One or more entities may be extracted from the metadata using NER techniques. Additionally or alternatively, control circuitry may access comment data relating to the video. For example, control circuitry may retrieve one or more comments made about the video, such as text comments made about the video and posted online, and/or audio comments made by previous viewers of the video. One or more entities may be extracted from the comments using NER techniques. Additionally or alternatively, control circuitry may cause a search or look-up to be performed, e.g., an internet search relating to the utterance data (e.g., one or more entities identified at 306) and/or another piece of contextual data, such as the metadata relating to the video. One or more entities may be extracted from the results of the lookup using NER techniques. In some examples, control circuitry may prioritize using one type of contextual data over another, e.g., based on the type of content to which the utterance data relates. For example, where the content is a video hosted on a webpage, such as the example shown in FIGS. 4A and 4B, control circuitry may prioritize obtaining the contextual data from the comments posted about the video, e.g., over retrieving metadata and/or searching the internet for data relating to the content, which may reduce overall operational demand placed on system 100.

At 310, control circuitry, e.g., control circuitry of server 104, determines a replacement entity (or supplemental entity) for one or more entities in the first subtitles 412, e.g., based on the contextual data. For example, in response to the entity "vol" being identified as a candidate entity for replacement, control circuitry may search the contextual data for one or more other entities that are phonetically similar to "vol". For example, the posts or comments relating to the video may have the entities "volatility" and "volume". In such a case, control circuitry may access the content metadata, which may have the entity "finance" as a tag, and perform a search to determine a semantic link between "volatility" and "finance". In this manner, control circuitry determines that the entity "volatility" is a more likely candidate for replacing "vol" in the first subtitles 412, e.g., by virtue of no (or week) semantic link between "volume" and "finance". In some examples, control circuitry may replace the entity "vol" with the entity "volatility", and perform a check to determine if the replacement of the entity has affected the confidence level and/or the comprehension level in the transcription of the utterance data. For example, replacement of the entity "vol" with "volatility" may have increased a confidence level relating to the accuracy of the transcription, but not affected a comprehension level of the transcription, since the entity "volatility" is a term relating to the finance industry, and thus may not be widely understood. In response to control circuitry determining that the confidence level has increased above the threshold confidence level but the comprehension level not decreasing below the threshold comprehension threshold, control circuitry may cause one or more further replacements until such criteria have been met. For example, process 300 may return from 310 to 306 and identify a second entity as another candidate for substitution. Once the confidence level is above the threshold confidence level and the comprehension level is below the threshold comprehension threshold, process 300 moves to 312. For example, process 300 may iterate until enough entities have been replaced (and/or supplemented) to achieve a predetermined accuracy level, e.g., to ensure that there are no or few errors in the transcription, and a predetermined comprehension level, e.g., to ensure that the transcription can be understood by a large enough subset of the intended audience of the media content and the subtitles. For example, control circuitry may determine a replacement sentence, either partially or fully replacing the first generated subtitles 412. For example, in the comments relating to the video, a first user may have commented, "What does he mean?". Such a comment may be time stamped as corresponding to a particular point in (or portion of) the video. For example, the comment may be time stamped as being made at or around 23 minutes into the video, e.g., as (or just after) one of the individuals in the video said " . . . hedging you know the vol properly and hedging the skew." In response to the first user's comment, a second user may have replied, "He means ' . . . and how that's going to affect skew and therefore implied volatility'". In this case, control circuitry may determine that the second user's comment is a suitable replacement for the first subtitles 412, e.g., based on user verification (such as a number of "likes" in relation to the reply of the second user).

At 312, control circuitry, e.g., control circuitry of server 104, generates second subtitles 414 for the utterance data. In the example shown in FIG. 4B, the second subtitles 414 comprises the sentence " . . . and how that's going to affect skew and therefore implied volatility". In this manner, the subtitles for the video have been improved, as any ambiguity regarding the meaning of the first transcribed subtitles 412 has been removed. This increase in clarity may aid the overall operational efficiency of system 100, since the amount of user comments requesting clarification of subtitle text may be reduced. Furthermore, the improved subtitles can be used as data when training an ASR model used in the auto-generation of subtitles, which may lead to a lower number of subtitles being generated and stored, thus reducing overall computational demand on system 100.

The actions or descriptions of FIG. 3 may be done in any suitable alternative orders or in parallel to further the purposes of this disclosure.

Figure 5:
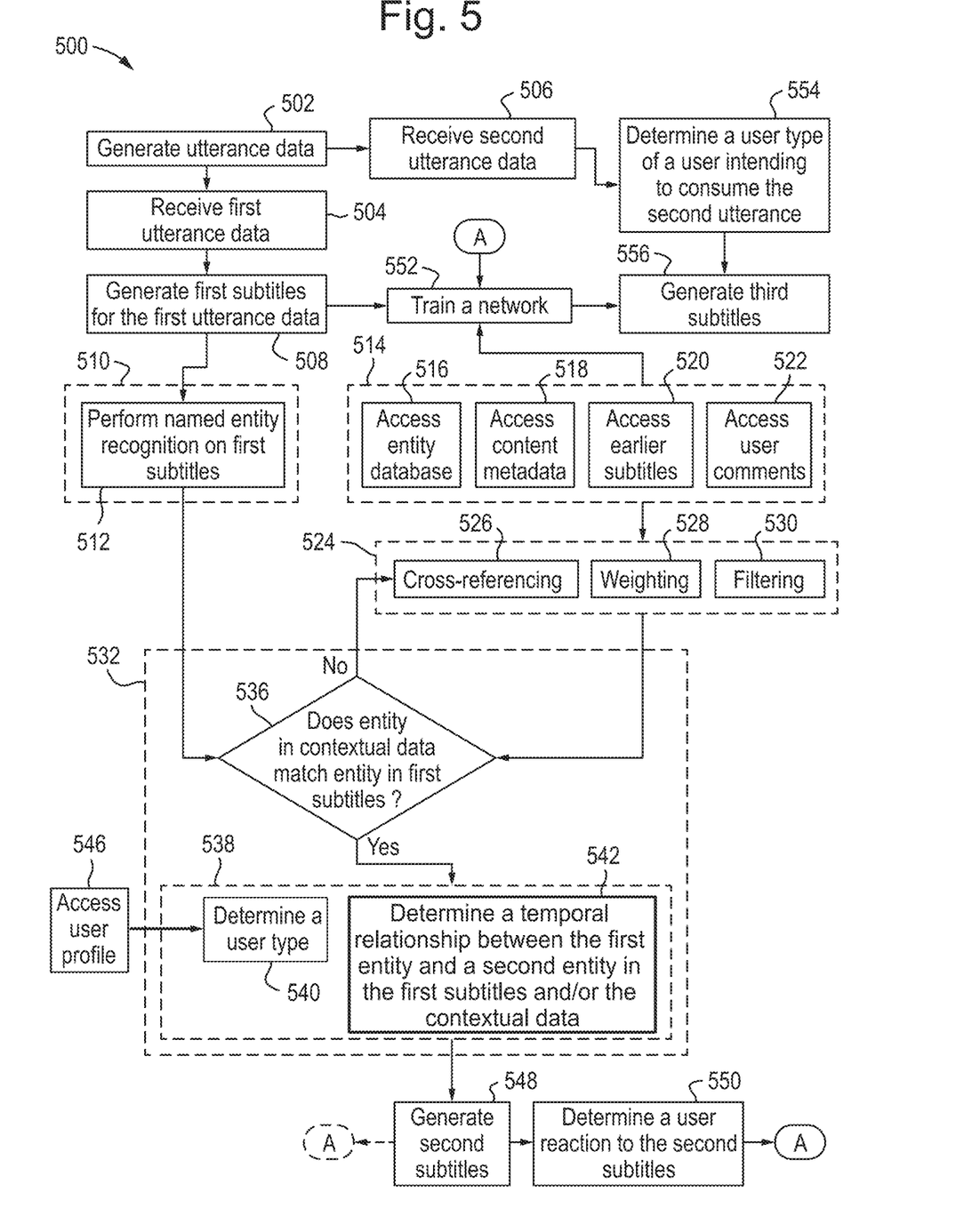
FIG. 5 is a flowchart representing a process for generating subtitles and training a network, in accordance with some examples of the disclosure.
Figure 6A:
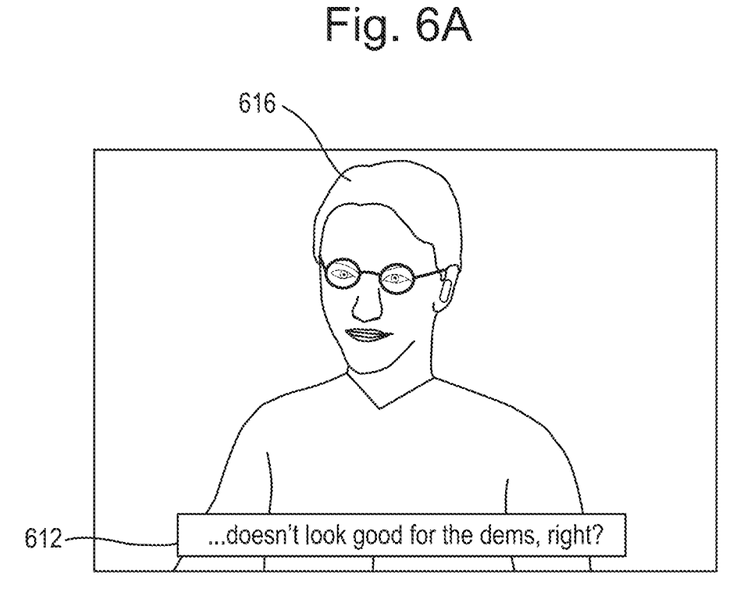
FIG. 6A illustrates an example of media content having first subtitles, in accordance with some examples of the disclosure.
Figure 6B:
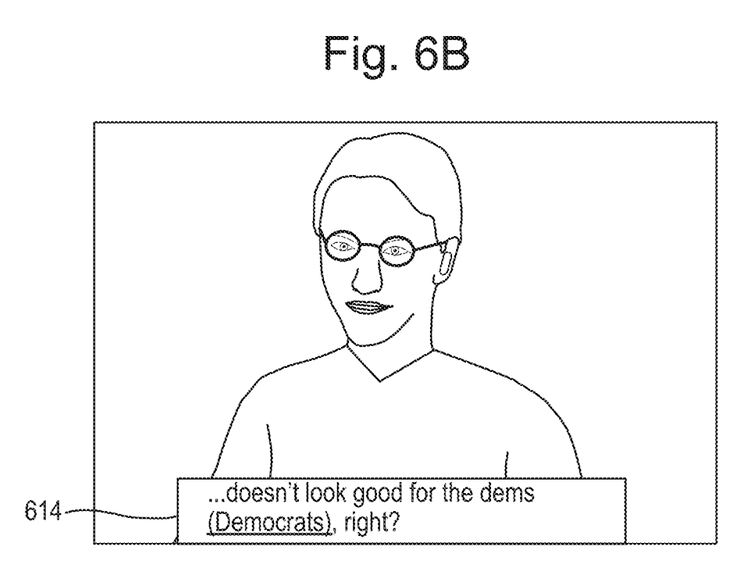
FIG. 6B illustrates an example of media content having second subtitles, in accordance with some examples of the disclosure.
Figure 6C:
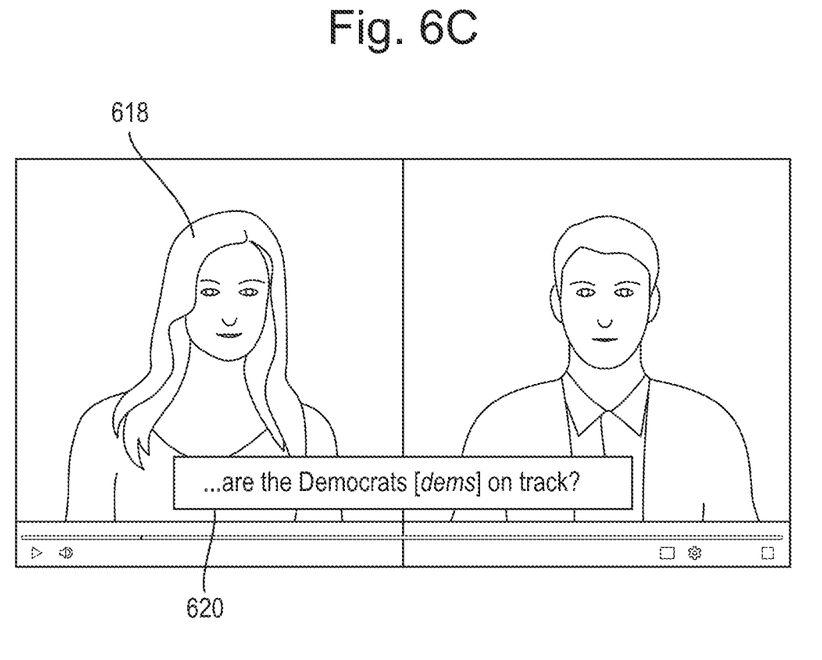
FIG. 6C illustrates an example of media content having third subtitles, in accordance with some examples of the disclosure.

FIG. 5 shows a flowchart representing an illustrative process 500 for generating improved subtitles and training a network executing an ASR model. FIG. 6A illustrates a media content item having first subtitles. FIG. 6B illustrates a media content item having second subtitles. FIG. 6C illustrates a media content item having third subtitles. While the example shown in FIGS. 5 to 6C refers to the use of system 100, as shown in FIG. 1, it will be appreciated that the illustrative process 500 shown in FIG. 5, with reference to FIGS. 6A to 6C, may be implemented, in whole or in part, on system 100, system 200, and/or any other appropriately configured system architecture. For the avoidance of doubt, the term "control circuitry" used in the below description applies broadly to the control circuitry outlined above with reference to FIG. 2. For example, control circuitry may comprise control circuitry of user device 102 and control circuitry of server 104, working either alone or in some combination.

At 502, utterance data is generated. For example, utterance data may be generated by recording an utterance of a user, e.g., to generate utterance data relating to one or more individuals who are speaking during a live event. In some examples, utterance data may be generated by separating an audio track from a video track of a content item, e.g., to generate utterance data relating to one or more individuals who are speaking in the content item. In the context of the present disclosure, the term "utterance data" is understood to mean any appropriate type of data relating to, or derived from, the speech of an individual. For example, utterance data may comprise sound wave data generated, e.g., in real-time or near real-time, by control circuitry receiving a sample of an individual who is speaking. Additionally or alternatively, utterance data may comprise a sound wave file relating to, or extracted from, a content item, such as a movie or internet video. In the example shown in FIG. 6A, the utterance data comprises speech data relating to an individual 616 speaking in an internet video. In particular, first utterance data is derived from the speech of the individual 616 speaking in a streamed video, such as a segment or excerpt from a news channel. In some examples, subsequent utterance data, e.g., second utterance data, may be generated. For example, second utterance data may relate to another portion of speech of the individual 616, and/or a portion of speech of another individual (not shown) in the video. In some examples, the second utterance data may comprise a repeat of the first utterance data, for example, when the video is played again. In the example shown in FIG. 6C, second utterance data comprises speech data relating to an individual 618 speaking in an internet video, such as a later segment of the video shown in FIG. 6A, or another, e.g., different, video.

At 504, control circuitry, e.g., control circuitry of server 104, receives first utterance data. At 506, control circuitry, e.g., control circuitry of server 104, receives second utterance data. In some examples, the utterance data may be processed in real or near time, e.g., by control circuitry of server 104. Additionally or alternatively, the utterance data may be stored, e.g., on storage of server 104, for processing at a later time. For example, utterance data may be stored and processed offline, e.g., to allow subtitles to be generated prior to content being displayed to (or otherwise consumed by) a user. The below description first describes the processing of the first utterance data received at 504. Processing of the second utterance data received at 506 is discussed below in more detail.

At 508, control circuitry, e.g., control circuitry of server 104, generates first subtitles for the first utterance data, e.g., in a manner similar to that described above for 304 of process 300. For example, an ASR system implemented at server 104 may process the utterance data and generate the first subtitles. In some examples, the ASR system may convert soundwave data into phonemes, phonemes into words and words into sentences. In the example shown in FIG. 6A, control circuitry generates first subtitles 612 " . . . doesn't look good for the dems, right?," and displays them during presentation of the video.

At 510, control circuitry, e.g., control circuitry of server 104, identifies one or more terms, e.g., words, entities, and/or phrases, etc., in the first subtitles 412, e.g., in a manner similar to that described above for 306 of process 300. In the example shown in FIG. 5, 510 comprises 512.

At 512, control circuitry, e.g., control circuitry of server 104, performs named entity recognition on the first subtitles 612. For example, control circuitry may be configured to identify each entity (or one or more certain entities) in the first subtitles 412, and then classify the identified entities into categories. For example, control circuitry may identify the entity "dems" as a key entity, since it is the subject of the sentence. As such, it is important that a user fully understand this term. In some examples, control circuitry may determine that a confidence level in the auto-generated transcription of the entity "dems" is high, e.g., based on the entity "dems" being a dictionary entry of the term "Democrats" (and there being no other dictionary entries for this term that make grammatical sense). However, control circuitry may determine that the term "dems" may be difficult to understand, e.g., based on the entity "dems" being a contraction of the term "Democrats", and thus having a comprehension level above a comprehension level threshold. For example, the first subtitles 612 " . . . doesn't look good for the dems, right?," may be an accurate transcription, but likely be difficult to understand by an audience not well versed in politics. As such, identification, carried out at 510, may be based on a comprehension level in the transcription being above a threshold comprehension level, e.g., by the entity "dems" being a contracted term, despite the transcription being accurate.

At 514, control circuitry, e.g., control circuitry of server 104, determines contextual data relating to the utterance data, e.g., in a manner similar to that described above at 308 of process 300. For example, control circuitry may use NER to extract metadata from the contextual data derived from 516, 518, 520 and/or 522, which make up 514, in the example shown in FIG. 5.

At 516, control circuitry, e.g., control circuitry of server 104, accesses one or more databases and performs look-up operation for the entity "dems". For example, control circuitry may perform an internet search and return various results, such as "The Democratic Party" and "differential electrochemical mass spectroscopy". An internet search may also return one or more alternative terms associated with a search result. For example, for the search result "The Democratic Party", alternative terms, such as "Leftists", etc., may be identified. The look-up operation may be used to establish one or more possible (e.g., candidate) replacement entities for the entity "dems", e.g., using NER.

At 518, control circuitry, e.g., control circuitry of server 104, accesses database 106 and retrieves metadata for the video being shown in FIG. 6A. For example, control circuitry may retrieve metadata relating to the video, such as one or more tags or other information added by the video provider, e.g., one or more topics covered by the video, a date and/or time of recording the video, one or more people/organisations featured in the video, location information, language information, etc. In the example shown in 6A, content metadata might comprise one or more tags, such as "politics", "Democrats", etc. The metadata may be used to establish one or more possible (e.g., candidate) replacement entities for the entity "dems", e.g., using NER.

At 520, control circuitry, e.g., control circuitry of server 104, accesses other subtitles that have already been generated and are related to the video. For example, control circuitry may access utterance data relating to an earlier portion of speech in the video. In some cases, an earlier portion of speech may have resulted in the generation of other subtitles, such as "Tonight, I'll be discussing recent developments for the Democrats". The earlier subtitles (and/or earlier utterance data) may be used to establish one or more possible (e.g., candidate) replacement entities for the entity "dems", e.g., using NER.

At 522, control circuitry, e.g., control circuitry of server 104, accesses comment data relating to the video. For example, control circuitry may retrieve one or more comments made about the video, such as text comments made about the video and posted online, and/or audio comments made by a viewer of the video. In some examples, a comment may be made in real or near time as the video is presented, during a previous presentation of the video, or at a time other than when the video is being presented, such as in response to one or more existing comments made about the video. For example, a user may post a comment, e.g., in an online chat session relating to the video, and control circuitry may parse, or otherwise analyse, the comment for entities having syntactic similarity with the entity "dems". Additionally or alternatively, control circuitry may access one or more live comments made about the video, e.g., while the video is being watched by an audience. The comment data may be used to establish one or more possible (e.g., candidate) replacement entities for the entity "dems", e.g., using NER.

At 524, control circuitry, e.g., control circuitry of server 104, processes the contextual data. For example, control circuitry may process the contextual data to improve its quality and/or reduce a total number of the replacement entities that have been identified as possible replacements. In the example shown in FIG. 5, 524 comprises 526, 528 and 530.

At 526, control circuitry, e.g., control circuitry of server 104, causes one type of contextual data to be cross-referenced with at least one other type of contextual data. For example, results from the look-up operation performed at 516 may be cross-referenced with metadata for the video accessed at 518. Additionally or alternatively, comment data accessed at 522 may be cross-referenced with content metadata accessed at 518 and other, e.g., earlier presented, subtitles accessed at 520. For the avoidance of doubt, the results of any of 516, 518, 520 and 522 may be cross-referenced in any appropriate manner to determine that one possible replacement entity for the entity "dems" is a more likely replacement than another possible replacement. For example, one or more of the possible entities determined at 516 may also have been determined at 518. In this manner, a common replacement entity between any of 516 to 522 may be determined to be a more likely replacement entity than another replacement entity.

At 528, control circuitry, e.g., control circuitry of server 104, prioritizes using one type of contextual data as a source of a replacement entity over another type of contextual data, e.g., aiming to ensure that an accurate and/or appropriate replacement entity is chosen. For example, control circuitry may weight one type of contextual data as a more preferred source of a replacement entity. Such weighting may be based on one or more factors. In some examples, weighting may be based on the type of content to which the utterance data relates. For example, where the content is a steamed video hosted on a webpage, such as the example shown in FIG. 6A, control circuitry may prioritize obtaining the contextual data from the comments posted about the video, e.g., over accessing user comments and/or searching the internet for data relating to the content. This will result in a higher chance of system 100 picking an entity obtained from this contextual data source as an accurate and/or appropriate potential replacement entity. For example, if previous, e.g., recent, subtitles (e.g., accessed at 520) are given a higher weight, then one or more replacement entities may be chosen from this contextual data source over other sources. In some examples, weighting may be based on a system setting. For example, control circuitry may have a default setting to use one or more types of contextual data over other types of contextual data, e.g., based on a type of user device 102 on which subtitles are being presented. For example, system 100 may have a default setting to use contextual data derived from user comments over previous subtitles. Additionally or alternatively, weighting may be based on a user setting. For example, control circuitry may access a user profile and determine a user setting for using one type of contextual data over another, e.g., based on a type of user device 102 and/or a location of the user 110/user device 102.

In some examples, 528 may be performed before 514. For example, control circuitry may prioritize obtaining the contextual data from the comments posted about the video, e.g., over retrieving metadata and/or searching the internet for data relating to the content, which may reduce overall operational demand placed on system 100. For example, control circuitry may be configured to determine a computational operational load associated with preforming any of 516, 518, 520, and prioritize obtaining the contextual data from one or more contextual data sources over sources, e.g., based on an amount of computational operational load associated with performing 514.

At 530, control circuitry, e.g., control circuitry of server 104, filters the contextual data. For example, control circuitry may be configured to identify a percentage of the possible candidate replacement entities for further processing. Additionally or alternatively, control circuitry may process the contextual data, e.g., using NLP techniques and/or NER, to remove entities from the contextual data that would make no grammatical and/or syntactic sense should they be used as a replacement entity. For example, entities such as "demonstration", "demote", "demographic", etc. may be removed from a set of candidate replacement entities, e.g., based on a low likelihood of the subtitles making grammatical and/or syntactic sense should they be used as a replacement entity.

At 532, control circuitry, e.g., control circuitry of server 104, determines, e.g., selects, a replacement entity based on the contextual data. For example, 514 and 524 may have produced a set of candidate, e.g., likely, replacement entities, such as the entities "Democratic Party" and "Liberals" (e.g., from a lookup operation), "Leftists" and "Democrat Party" (e.g., from user comments), "Libs" (e.g., from a lookup of synonyms and/or phonetically similar terms of "Liberals"), and "Democrats" (e.g., from content metadata). In the example shown in FIG. 5, 532 comprises 536 to 542.

At 536, control circuitry, e.g., control circuitry of server 104, determines whether an entity in contextual data matches an entity in the first subtitles, e.g., using performs phonetic similarity analysis. For example, control circuitry may compare an entity identified at 510 with a set of candidate replacement entities produced using 514 and 524. In some examples, control circuitry may access one or more system setting to determine a phonetic similarity threshold (e.g., low/high), and compare the entity identified at 510 with each of the set of candidate replacement entities to determine whether a phonetic similarity between the entity identified at 510 and each of the set of candidate replacement entities is greater than the phonetic similarity threshold. For example, the entity "dems" (from 510) may have a low phonetic similarity with the candidate replacement entities "Libs" and "Leftists" (from 514 and 524). In the event that none of the set of candidate replacement entities match the entity "dems" (e.g., a phonetic similarity below a phonetic similarity threshold), process 500 moves back to 524. In this case, one or more parameters controlling 526, 528 and/or 530 may be adjusted, so as to result in a larger set of candidate replacement entities. On the other hand, the entity "dems" (from 510) may have a high phonetic similarity with the candidate replacement entities "Democrats", "Democratic Party" and "Democrat Party" (from 514 and 524). In the event one or more of the set of candidate replacement entities match the entity "dems" (e.g., a phonetic similarity equal to or greater than a phonetic similarity threshold), process 500 moves to 538. In the example shown in FIG. 5, 538 comprises 540 and 542, which may be performed in parallel or as alternatives.

At 538, control circuitry, e.g., control circuitry of server 104, selects a replacement entity from candidate replacement entities. In some examples, a replacement entity may be chosen based on, at least in part, the processing of the contextual data performed at 524. For example, a candidate replacement entity having a highest weighting may be chosen as the replacement entity, or a candidate replacement entity that is common among a highest number of sources of the contextual data may be chosen as the replacement entity.

At 540, control circuitry, e.g., control circuitry of server 104, determines a user type of a user, and selects the replacement entity based on the user type. In some examples, control circuitry may determine a user type of a user currently consuming (or intending to consume) the subtitles. For example, control circuitry accesses a user profile, at 546, to determine one or more user preferences of a user currently consuming (or intending to consume) the subtitles. In some examples, a user may be identified in any appropriate manner, e.g., using login credentials used when accessing user device 102, or a website on the user device 102. Upon identifying a user, a user profile may be accessed at 546. The user profile may indicate a preference for a preferred source of contextual data from which a replacement entity is derived, e.g., a user may set a preference for system 100 to select a replacement entity from contextual data derived from user comments. In some examples, a user profile may indicate a user preference, such as a preference for a type of media content (e.g., non-offensive language versus offensive language), a reading style (e.g., using a contraction of a term versus a full spelling of a term), etc. In some examples, a user profile may be cross-referenced with the contextual data to determine a user preference that at least partially relates to the derived contextual data. In the example shown in FIG. 5, the user profile indicates a political preference (e.g., a preference for the Democrats over other political parties). In this case, control circuitry may identify the candidate entities "Democrats" and "Democratic Party" as preferred replacement entities, since the entity "Democrat Party" is a disparaging term used by opponents.

At 542, control circuitry, e.g., control circuitry of server 104, determines a temporal relationship between the first entity and the contextual data. In the example shown in FIG. 5, control circuitry determines a temporal relationship between the "dems" identified at 510 and the contextual data determined at 514 and 524. For example, control circuitry may determine a first timestamp associated with the display of "dems" in the subtitles and a second timestamp associated with the contextual data. For example, control circuitry may determine the first time stamp by determining that the display of "dems" in the subtitles relates to an utterance at a certain point in the utterance data (e.g., 26 minute and 45 seconds from the start of the utterance data), which, in turn, might relate to a certain point in the run-time of the media asset to which the utterance belongs (e.g., 36 minute and 5 seconds from the start of the media asset), or a transmission time of the media asset (e.g., 7:54 PM). Similarly, control circuitry may determine the second time stamp by determining that the contextual data was created at a certain time. For example, where the contextual data is derived from user comments, control circuitry may determine a time at which the user comment was made, either relative to the timing of the utterance data (e.g., 26 minute and 45 seconds from the start of the utterance data), or more generally, e.g., relative to a transmission timing (e.g., 7:54 PM). The first timestamp can then be compared to the second timestamp, e.g., to determine whether the first timestamp is within a threshold time of the second timestamp. For example, the first timestamp for "dems" might be within the threshold time of a second timestamp for the candidate replacement entity "Democrats", but outside of a threshold time of a second timestamp for the candidate replacement entity "Democratic Party". As such, the candidate replacement entity "Democrats" may be selected as the replacement entity for the entity "dems".

At 548, control circuitry, e.g., control circuitry of server 104, generates second subtitles. In the example shown in FIG. 6B, control circuitry generates second subtitles 614 ". . . doesn't look good for the dems (Democrats), right?", in which "Democrats" has been inserted following "dems". In this example, "Democrats" is displayed in parentheses, indicating that it was not a direct transcription of the utterance data, and is underlined, indicating that it is also a hyperlink to information relating to the entity "Democrats". In this manner a user is aware that the speaker 616 in the video did not use that language, and may also access information on the term, e.g., a web page, should the user wish to find out more information. In some examples, system 100 may have a setting to selective activate and deactivate this feature.

At 550, control circuitry, e.g., control circuitry of server 104, determines user reaction(s) to the first and/or second subtitles 612, 614. For example, control circuitry may be configured to determine user reaction to the first subtitles based on determining that the display of "dems" resulted in an amount of contextual data being generated, e.g., within a predetermined period. In some examples, a relatively large amount of contextual data generated, e.g., in a relatively short period, may be regarded as a negative user reaction. For example, control circuitry may determine that a relatively large amount of contextual data, e.g., a relatively large number of user comments, being generated, around the time at which "dems" was displayed (e.g., relative to the first timestamp). This may be regarded as a negative user reaction. In some examples, a threshold number of user comments may be set. For example, control circuitry may monitor user comments and flag when a threshold number of user comments relating to a certain thread has been met. For example, display of "dems" may have resulted in a long online chat thread regarding the meaning of the term "dems". Conversely, following the display of "Democrats", a relatively small amount of contextual data generated, e.g., in a relatively long period, may be regarded as a positive user reaction. Additionally or alternatively, control circuitry may monitor one or more user reactions within a time frame relative to the display of "dems". For example, control circuitry may determine when a user pauses a video following the display of "dems" and performs a manual search operation, e.g., to try to determine the meaning of the term. For example, performing a larger amount of (and/or more frequent) pause and search functions following the display of "dems" may indicate a negative user reaction, while performing a smaller amount of (and/or less frequent) pause and search functions following the display of "Democrats" may indicate a positive user reaction. Additionally or alternatively, user device 102 may be configured to determine expressions and/or gestures of a user reading the first subtitles in order to determine a user reaction to the subtitles. For example, a user may have reacted in a confused manner in response to reading "dems", e.g., by making a certain facial expression. In some examples, system 100 may determine a facial expression using a facial emotion recognition system and/or a gesture using a gesture recognition system. For example, a confused expression and/or gesture may be regarded as a negative user reaction, while a happy, agreeable, or a lack of expression/gesture following the display of "Democrats" may be regarded as a positive reaction. In response to determine a positive or negative user reaction, control circuitry may log a type of user reaction corresponding to the display of "dems" and/or "Democrats". In some examples, control circuitry may compare the user reactions to the second subtitles (displaying "Democrats") with the user reaction(s) to the first subtitles (displaying "dems"). In the case where user reaction to the second subtitles was more positive than user reaction to the first subtitles, e.g., by virtue of fewer comments, search operations, playback operations, etc., control circuitry may determine that replacement of "dems" with "Democrats" was a positive replacement. In the context of the present disclosure, the term "positive replacement" is understood to mean when replacement of an entity and/or supplementation to an entity in a portion of subtitles resulted in more positive user reaction(s). For example, a lower amount of operational load being placed on system 100 following more positive user reaction(s), since there will typically be fewer following operations, such as searches, comments, discussions, etc., in response to a comprehensible and/or appropriate entity in the subtitles. In the example shown in FIG. 5, 550 moves to 552 (see arrow A). Additionally or alternatively, 548 may move directly to 552 (see dashed arrow A).

At 552, control circuitry, e.g., control circuitry of server 104, trains, e.g., updates, one or more networks implementing an ASR model, such as the ASR model that generated the first subtitles at 508. The network may be trained using one or more types of data. For example, the ASR model that generated the first subtitles at 508 may be trained using the first subtitles generated at 508, the contextual data generated at 514, the second subtitles generated at 548 and/or the logged user reaction(s) corresponding to the first and/or second subtitles, determined at 550. In the example shown in FIG. 5, the trained model is used to generated third subtitles for received second utterance data.

As discussed earlier, at 506, second utterance data is received. In the example shown in FIG. 6C, second utterance data comprises speech data relating to an individual 618 speaking in an internet video.

At 554, control circuitry, e.g., control circuitry of server 104, determines a user type of a user intending to consume the second utterance. For example, control circuitry may determine a user type in a manner similar to that described at 540. For example, control circuitry may determine that the user watching the video shown in FIG. 6C is the same user watching the video shown in FIG. 6B. However, the user watching the video shown in FIG. 6C may be any other user.

At 556, control circuitry, e.g., control circuitry of server 104, generates third subtitles. For example, the trained ASR model may replace, e.g., automatically without any further processing, "dems" with "Democrats". In the example shown in FIG. 6C, "Democrats" has been inserted such that it appears as part of the subtitles, e.g., not shown in parentheses. Instead, in this example, "dems" appears immediately after "Democrats", indicating to the user that a replacement entity has been used. In some examples, system 100 may have a setting to selective activate and deactivate this feature. In an alternative example, a different user may be viewing the video shown in FIG. 6C. In such a case, control circuitry may determine, e.g., by accessing a user profile of the different user, that the different user shares one or more preferences. For example, the different user may have a similar language comprehension level to the user viewing the video show in FIG. 6B. As such, control circuitry may determine that a similar subtitle replacement/supplementation is likely to be acceptable to the different user.

In some examples, the ASR model may be trained to selectively replace one or more entities. For example, where the first and second utterance data relate to the speech of the same individual, the ASR may implement one or more rules to automatically map a previously used replacement entity onto one or more future entities for that individual. For example, where one individual uses "dems" throughout their speech, the ASR model may automatically replace "dems" with "Democrats" each time it is used. In some examples, should another individual use the entity "dems" control circuitry may determine whether another replacement entity could be used with a higher confidence level and/or comprehension level (e.g., as discussed above at 306 onwards).

In some examples, as an optimization for real-time performance, an updated ASR model may map, e.g., automatically, specific utterance data and corresponding subtitle portion(s), e.g., the entity "dems", that was replaced and/or supplemented by another entity, e.g., the entity "Democrats". Thus, anytime the same or similar utterance data is received by the ASR model, mapping of the will be done, e.g., automatically, via lookup to the previously made replacement and/or supplementation. This mapping may carry across the same video in its entirety. In another example, such mapping may be associated with a specific user as metadata and the same mapping may carry over to all videos that this specific user views. In a similar manner, if the mapping for an entity, e.g., an acronym used in an utterance, has been applied once for a video, it may then apply to the entire subtitling of the video, and/or to other videos that belong to the same channel and/or videos that have the same or similar topic/subject context.

The actions or descriptions of FIG. 5 may be done in any suitable alternative orders or in parallel to further the purposes of this disclosure.

The following examples are included as part of and may be combined with, where technically appropriate, the above disclosure. In some examples, one or more audio tracks may be generated based on the improved subtitles, e.g., second and/or third subtitles. For example, an audio (e.g., spoken word) file may be generated corresponding to the improved subtitles. For example, an original utterance (either of a live event or recorded media content) may be dubbed with an audio file generated based on the improved subtitles. For example, an automated dubbing system may receive data relating to the improved subtitles and generate an audio file for dubbing the original utterance. In some examples, where the utterance data relates to an audio only source, such as a live audio feed, or recorded audio-only media content (e.g., an audio book), an automated dubbing system may insert a spoken word corresponding to the replacement entity. In such a case, the live audio feed or the recorded audio-only media content may be time-shifted to account for a spoken form of the replacement entity, which may be longer or shorter than the original entity which it replaces and/or supplements. In this manner, the present disclosure allows for different versions of an audio track to be generated for an audio file based on the generated improved subtitles. In this manner, options, such as beginner versus advanced, may be presented to a user for selecting a dubbed audio track. For example, a first audio track may be generated comprising easily understood entities, such as "volatility" and "Democrats", while a second audio track may be generated comprising entities more difficult to understand, such as "vol" and "dems".

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method using control circuitry for generating subtitles comprising:
    receiving utterance data corresponding to a media item;
    generating first subtitles for the utterance data;
    identifying a first term in the first subtitles;
    determining contextual data relating to the utterance data, the contextual data comprising at least one of: user-generated comments, or historic subtitle data;
    accessing a user profile comprising a plurality of user preferences;
    determining, based on an automatic speech recognition (ASR) model trained with the contextual data, a replacement term for the first term, wherein the replacement term corresponds to at least one of the plurality of user preferences; and
    generating second subtitles for the utterance data, the second subtitles comprising the replacement term.

2. The method according to claim 1, the method comprising:
    filtering the contextual data prior to determining the replacement term.

3. The method according to claim 1, the method comprising:
    determining a temporal relationship between the first term and a second term in the first subtitles; and
    generating the second subtitles based on the temporal relationship between the first term and the second term in the first subtitles.

4. The method according to claim 1, wherein determining the contextual data comprises at least one of:
    determining at least one user comment relating to the utterance data;
    performing a search of a database for information relating to the utterance data;
    accessing historic utterance data; or
    accessing metadata relating to the utterance data.

5. The method according to claim 4, wherein determining the contextual data comprises:
    determining a temporal relationship between the first term in the first subtitles and the at least one user comment.

6. The method according to claim 1, wherein the contextual data comprises multiple types of contextual data, the method comprising:
    weighting the different types of contextual data; and
    wherein determining the replacement term is based on a higher weighted type of contextual data.

7. The method according to claim 1, the method comprising:
    determining a user type of a user intending to consume the second subtitles; and
    wherein determining the replacement term comprises selecting the replacement term from multiple suitable replacement terms based on the user type.

8. The method according to claim 1, the method comprising:
    determining a user reaction relating to the first subtitles; and wherein determining the replacement term comprises selecting the replacement term from multiple suitable replacement terms based on the user reaction.

9. The method according to claim 1, the method comprising:
training one or more networks using the first subtitles, the second subtitles and the contextual data.

10. The method according to claim 9, the method comprising:
determining a user reaction relating to the second subtitles;
training one or more models based on the user reaction to the second subtitles; and
generating third subtitles using the trained one or more networks.

11. A system comprising control circuitry configured to:
receive utterance data corresponding to a media item;
generate first subtitles for the utterance data;
identify a first term in the first subtitles;
determine contextual data relating to the utterance data, the contextual data comprising at least one of: user-generated comments, or historic subtitle data;
access a user profile comprising a plurality of user preferences;
determine, based on an automatic speech recognition (ASR) model trained with the contextual data, a replacement term for the first term, wherein the replacement term corresponds to at least one of the plurality of user preferences; and
generate second subtitles for the utterance data, the second subtitles comprising the replacement term.

12. The system according to claim 11, wherein the control circuitry is configured to:
filter the contextual data prior to determining the replacement term.

13. The system according to claim 11, wherein the control circuitry is configured to:
determine a temporal relationship between the first term and a second term in the first subtitles; and
generate the second subtitles based on the temporal relationship between the first term and the second term in the first subtitles.

14. The system according to claim 11, wherein, when determining the contextual data, the control circuitry is configured to perform at least one of the following:
determine at least one user comment relating to the utterance data;
perform a search of a database for information relating to the utterance data;
access historic utterance data; or
access metadata relating to the utterance data.

15. The system according to claim 14, wherein the control circuitry is configured to:
determine a temporal relationship between the first term in the first subtitles and the at least one user comment.

16. The system according to claim 11, wherein the contextual data comprises multiple types of contextual data, the control circuitry being configured to:
weight the different types of contextual data; and
determine the replacement term is based on a higher weighted type of contextual data.

17. The system according to claim 11, wherein the control circuitry is configured to:
determine a user type of a user intending to consume the second subtitles; and
determine the replacement term by selecting the replacement term from multiple suitable replacement terms based on the user type.

18. The system according to claim 11, wherein the control circuitry is configured to:
determine a user reaction relating to the first subtitles; and
determine the replacement term by selecting the replacement term from multiple suitable replacement terms based on the user reaction.

19. The system according to claim 11, wherein the control circuitry is configured to:
train one or more networks using the first subtitles, the second subtitles and the contextual data.

20. The system according to claim 19, wherein the control circuitry is configured to:
determine a user reaction relating to the second subtitles;
train one or more models based on the user reaction to the second subtitles; and
generate third subtitles using the trained one or more networks.

* * * * *